United States Patent [15] 3,650,569
Kawabe et al. [45] Mar. 21, 1972

[54] BRAKE REGULATOR FOR AUTOMOTIVE VEHICLE

[72] Inventors: Tsuneo Kawabe; Hirotaka Miyake; Shinji Kawai; Masasi Ban, all of Kariya City, Japan

[73] Assignee: Aisin Seiki Kabushiki Kaisha, Kariya, Aichi Pref., Japan

[22] Filed: July 1, 1969

[21] Appl. No.: 838,123

[30] Foreign Application Priority Data

July 5, 1968 Japan..................................43/46484
Aug. 20, 1968 Japan..................................43/59457

[52] U.S. Cl..................................303/6, 60/54.5, 188/151, 188/152, 303/84
[51] Int. Cl..................B60t 8/26, B60t 11/34, B60t 17/18
[58] Field of Search..............188/151, 151.11, 152, 152.11; 303/6, 6 C, 22, 22 A, 84, 84 A; 60/54.5

[56] References Cited

UNITED STATES PATENTS

| | | | |
|---|---|---|---|
| 3,441,318 | 4/1969 | Bueler | 303/6 |
| 3,450,443 | 6/1969 | Bueler | 303/6 |
| 3,464,741 | 9/1969 | Falk | 303/6 |
| 3,467,440 | 9/1969 | Strien | 303/6 |
| 3,480,333 | 11/1969 | Stelzer | 303/6 |
| 3,492,051 | 1/1970 | Kersting | 303/6 |

Primary Examiner—Milton Buchler
Assistant Examiner—John J. McLaughlin
Attorney—Pierce, Scheffler & Parker

[57] ABSTRACT

A pressure control valve for motor-vehicle fluid brake system having a control means responsive to an accidentally decreased fluid pressure to change a restoring force of the valve device which is normally responsive to a predetermined fluid pressure force whereby accidentally decreased braking force caused by breakage of another brake system can be supplemented by an application of an additional force to the brake pedal.

5 Claims, 5 Drawing Figures

BRAKE REGULATOR FOR AUTOMOTIVE VEHICLE

BACKGROUND OF THE INVENTION

This invention relates to a brake regulator and more particularly to a control valve for use in such a fluid pressure system.

In order to obviate the skidding or slipping of the rear wheel of the motor-vehicle during rapid deceleration, various devices has been proposed to reduce the ratio of rear wheel brake pressure to front wheel brake pressure at such times. On other hand, it has been desired that to insure the motor-vehicle necessary braking force to oppose, under a circumstance of breakage of the braking system, a minimum obstruction to the security of the travel, a plurality of braking systems is required so that any of remainder of the systems still operates.

It is desirable to obtain a supplementary braking force by applying an additional in-put of fluid pressure to such remainder without defeating the predetermined ratio of the brake pressure at the time of such breakage.

The present invention is directed to the provision of a device to supply an additional restoring force to the differential piston of the control valve so that the switchover point or inclination is changed in the graphical representation of the braking pressure to attain an output pressure nearly close to the out put pressure under the unbreaked normal condition.

It is the principal object of the present invention to provide a control valve for overcoming the aforementioned undesirable and disadvantageous conventionally not overcome features of the control valve.

Another object of the invention is to provide a control valve for effecting substantially and nearly equivalent output pressure of fluid by applying an additional force to the brake pedal in comparison with the total output pressure of fluid attained in normal operation.

SUMMARY OF THE INVENTION

Briefly, the present invention embodies a control valve having a cylinder, and twofold control means normally permitting pressure fluid flow therethrough, one of said means being responsive to a predetermined fluid pressure to interrupt pressure fluid flow through the cylinder and said second control means being responsive to a sudden decrease of fluid pressure caused by breakage of any of the fluid systems to change the responsiveness of said first control means to a responsiveness of higher fluid pressure.

The above and other objects and advantages of the present invention will become apparent from the following description, reference being made to the accompanying drawing in which:

DESCRIPTION OF THE PREFERRED EMBODIMENT

Figure 1:
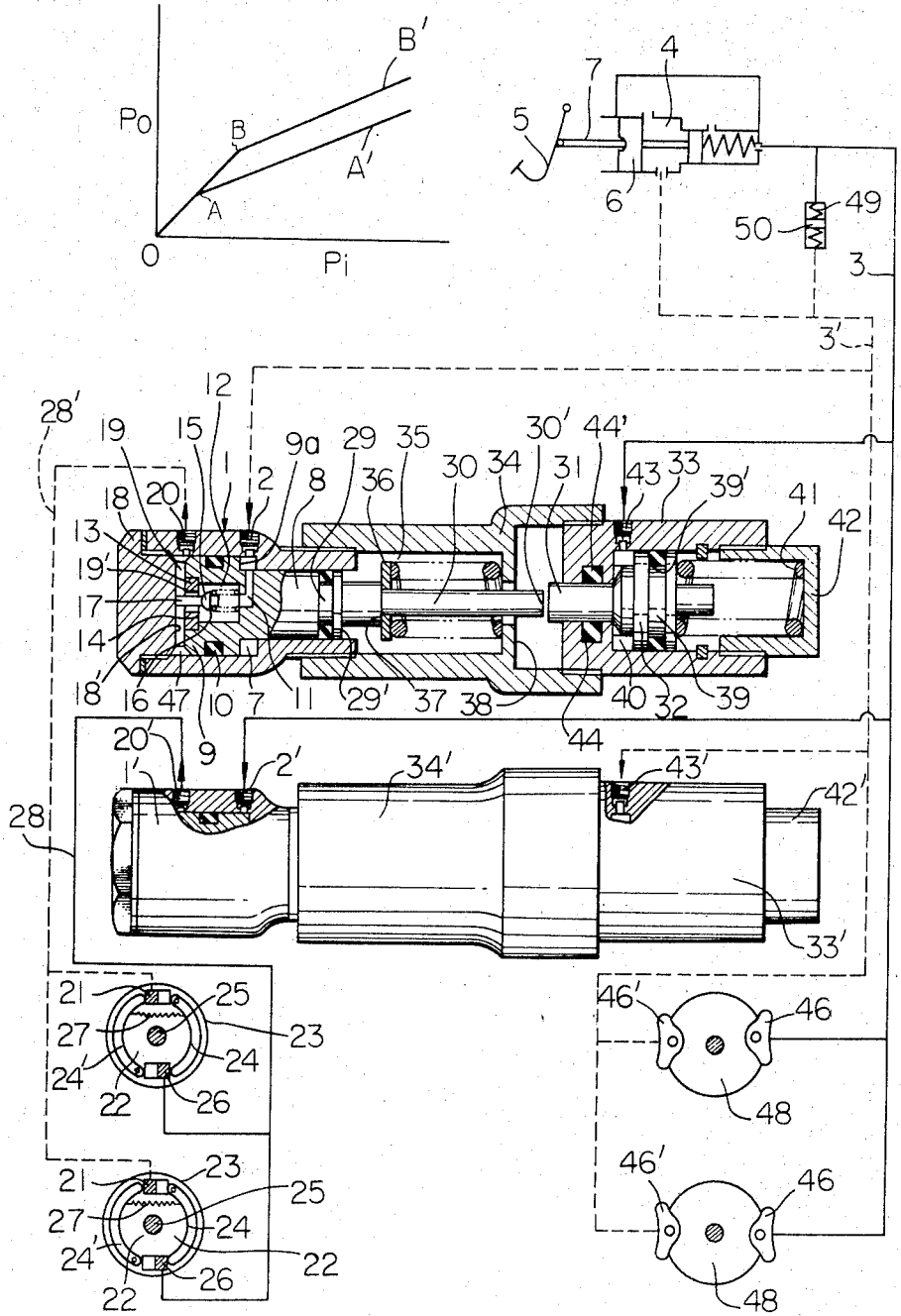
FIG. 1 is an axial cross sectional view of a brake regulator according to the present invention, with the remaining parts of the brake system shown only diagrammatically.

In FIG. 1, there is shown brake regulators 1 and 1' which are provided with inlets 2 and 2' respectively for the brake fluid. These inlets are connected via hydraulic transmission lines 3 and 3' to a master cylinder 4 shown schemetically in FIG. 1. A brake pedal 5 is pivotally mounted on the structure of the motor vehicle and is connected to the piston 6 of the master cylinder via rod 7. The master cylinder 4 is mounted to the vehicle at its extremity opposite to the pedal 5. Fluid inlet 2 communicates with a central chamber 7 receiving a piston 8 whose head 9 has a sealing ring 10 set in a circumferential groove formed in the head. In FIG. 1, both regulators 1 and 1' have the same configuration and the description of the embodiment of FIG. 1 will be made hereinafter with reference to regulator 1. The regulator piston 8 is provided with a radial bore 11, communicating with the chamber 7, which turns at the central portion of the head 9 and terminates in a axial compartment 12 therein. A cap 13 is threaded into the compartment and forms a valve seat 14 for a valve member 15 axially shiftable in this compartment selectively to block and unblock the passage 11. The valve member 15 is formed with an annular shoulder 16 against which a spring bears to urge the shoulder against the seat 14. Member 15 is also provided with a stud 17 slidably fitted in the hole of the cap 13 having axially extending ridges on the inner surface of the hole which defines between them passages for hydraulic fluid. Stud 17 extends through the hole of the cap 13 into engagement with juxtaposed surface 18' of a plug 18 whose axial recess defines with the piston 8 a second chamber 19. The surface 18' constitutes abutment means for holding the valve 15 in its open position. The hydraulic fluid can flow from the chamber 19 through an outlet 20 to the cylinder 21 of the brakes for the rear wheels of the vehicle. The brake of the rear wheel of the vehicle shown in FIG. 1 comprises a brake drum 23 against which a pair of brake shoes 24 and 24' may be urged by a force of fluid pressure exerted in the cylinders 21 and 26, the end of which is pivoted to a disk 22 on the axle 25. Spring 27 tends to draw the shoes 24 and 24' out of engagement with the brake drum 23. The transmission lines 28 and 28' connect the brake cylinders 21 and 26 with the regulators 1 and 1' at their outlets 20 and 20' respectively. Piston 8 is provided with a further circumferential groove 29, in which a ring-type seal 29' is received for preventing escape of the hydraulic fluid. Rearwardly of this seal, the piston is provided with a stem 30 which extends axially outwardly of the body of the regulator 1 and has an end surface 30' against which a stud 31 of the other piston 32 is provided in such manner that the stud 31 shifts to the right in synchronism with the stem 30 in normal operation so that prevention against the movement of the stem 30 may be avoided but is in abutting relationship with the end of stem 30 in its activated condition as hereinafter described in greater detail. The cylinder 33 is connected with the body of the regulators by connecting member 34 interposed between the regulator 1 and the cylinder 33 by means of threads at both ends of the member 34. The spring 35 bears against the annular retainer 36 interposed between the spring and shoulder 37 of the stem 30 and against another bearing rib 38 on the inner surface of the member 34, so that the restoring force of the spring 35 is applied to the stem 30. Piston 32 received in the cylinder 33 is provided with a circumferential groove 39, in which a ring-type seal 39' is received for preventing escape of the hydraulic fluid. The compression spring 41 bears against the piston 32 and the bottom of socket 42 threaded with the cylinder 33 so that restoring force is applied against the piston. The cylinder 33 is provided with an inlet 43 which is connected the master cylinder 4 by transmission line 3 interposed between the cylinder and the master cylinder 4, and further provided with a circumferential groove 44, in which a ringtype seal 44' is received for preventing escape of the hydraulic fluid. When the fluid pressure is transmitted from the master cylinder via line 3 to this cylinder 33, the piston 32 is displaced by the pressure to the right in FIG. 1, against the force of the spring 41. As previously described, the regulator 1' has the same configuration as that of the regulator 1: As will be seen in FIG. 1, the transmission lines 3 and 3' independently connect the master cylinder 4 with the front wheel disk brake 46 and 46' respectively. The transmission line 3 further connects the master cylinder 4 with the cylinder 33 at its inlet 43 and the regulator 1' at its inlet 2'. The transmission line 3' similarly to the line 3, connects the master cylinder 4 with the regulator 1 at its inlet 2 and the cylinder 33' at its inlet 43'.

Prior to initiation of braking action, the piston 8 is in the position shown in FIG. 1 i.e., biased to the left by the spring 35 whereby the valve 15 is held open against the abutment surface 18′, and the second chamber 19 is maintained by means of a projection 47 on the inner surface of the head 9 of the piston 8.

When it is desired to initiate the braking action, the brake pedal is depressed to force fluid from the master cylinder 4 via transmission line 3 and 3′ into the front wheel brake directly and the rear wheel brake cylinder through regulators 1 and 1′ indirectly. The cylinders 33 and 33′ receive the force of fluid pressure exerted in the master cylinder simultaneously with the regulators 1 and 1′. Since the valve 15 is open, the fluid passes via bore 11 into piston compartment 12 and thence outwardly past valve seat 14 through the grooves between ridges on the inner surface of the cap 13 into the second chamber 19. The pressure fluid is thus transmitted via line 3′ and regulator 1 to the rear brake cylinder 21 whose piston urges the brake shoe 24′ into engagement with the brake drum 23 against the force of the spring 27. Since the annular surface of the piston head 9, within the chamber 7 has a area A1, which is less than that of the oppositely facing surface 19 of the head, that is the difference of the area of between the area of the surface 19′ and the sectional area of the piston 8 is less than that of the surface 19′, the piston 8 begins to move toward the right against the force of the spring 34. The area A2 ascribed for convenience to surface 19′ is, of course, the only surface effective in the opposite direction. By virtue of the differential action, the piston 8 progressively compresses the spring 35 and draws the valve seat 14 toward the valve 15. It is apparent that when the valve is open the pressures in the chambers 7 and 19 are equal and increase uniformly so that P × (A2 − A1) defines the hydraulic force F effective to shift the piston to the right. This displacement continues only until the force F equals the force F3 of the spring 35. By this the brake cylinder 21 is charged with hydraulic pressure P so that braking action is initiated.

Additional force applied to the brake pedal results in the displacement of piston 8 sufficiently to close the valve 15, i.e., to bring the valve seat 14 into engagement with the valve 15. Since the valve is now closed, further displacement of the piston 8 in response to application of additional pressure to the fluid in the master cylinder 4 can not result in any substantial displacement of the piston. The application of such additional pressure, however, requires that the forces applied to the spring 35 and the fluid in chamber 7 be substantially equal to the opposing force derived from the pressure of the fluid in chamber 19. Consequently, F3+F1=F2, where F2 is the hydraulic force applied to surface area A2 and F1, is the force applied to the annular surface A1. In order to formulate the invention, the description herein above made has been on the assumption that the piston 32 and its attendants in FIG. 1 are not provided, and the piston 32 and its attendants hereinafter described in detail are the most important characteristics of the present invention. Since the operations performed by both regulators 1 and 1′ are the same, the brake shoes 24 and 24′ are urged simultaneously and independently into engagement with the brake drum against their restoring spring 27 by the pistons of the wheel brake cylinders 21 and 26, while with the disk 48 of the front brakes 46,46′ are engaged.

It is apparent that in normal operation the piston 33 is timely displaced to the right in synchronism with the displacement of the piston 8 of the regulator 1 so that there exists no obstacle against the movement of the stem 30 of the piston 8. The desired total brake force which is applied to each of the wheels relies upon the force effected by the pair of wheel brake cylinders 21 and 26 or the like provided for the disk brakes 46 and 46′ of the front wheels.

Figure 2:
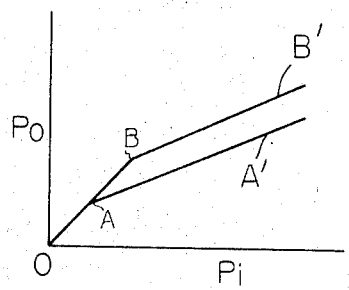
FIG. 2 is a graphical representation of the fluid pressure system as effected by the embodiment of the regulator as shown in FIG. 1.

As illustrated by the graphical representation of the braking pressure of FIG. 2, until the displaced pressure fluid attains the value A, the output fluid pressure Po from each of the regulators 1 and 1′ to the rear brake cylinders 24 and 24′ is in direct proportion, i.e., a 1 : 1 ratio, with the input fluid pressure Pi to the front brake 46, 46′, as shown by the line O-A, where A is the switch over point. When the predetermined value of the fluid pressure A is obtained, the piston 8 has been moved to the right to sealably engage valve 15 with the valve seat 14 interrupting pressure fluid communication between the chambers 7 and 19 through the hole of cap 13 and thereby, still additional force applied to the brake pedal 5 results in a fluttering movement of the piston 8. Thereafter, any further increase in the pressure fluid in the chamber 7 is effective at the rear wheel brake cylinders in the ratio of A2 : A1 as shown, since forces F1 and F2 are equal, respectively, to P1 × A1 and P2 × A2, it will be evident that any change dF1 in the chamber 7 will result in a like change in the hydraulic force within chamber 19. Therefore, dP1 × A1 must be substantially equal to dP2 × A2 where it may be seen that the pressure in chamber 19 which is applied to the brake cylinder 21 is a fraction of that applied to the chamber 7, the fraction being determined by the ratio of the areas of the differential piston 8. The brake pressure P2 at which piston 8 will have been displaced by the hydraulic fluid sufficiently to close the valve is, of course, determined by the restoring force of the spring 35. Accordingly, if the restoring force of the spring 35 is varied, the switchover point will be shifted.

Upon release of the brake pedal 5 the pressure P1 falls rapidly whereupon the piston 8 entrains the valve to the right under the force F2 of the fluid within the chamber 19, the brake shoe 24′ being simultaneously relaxed. The piston 8 is displaced to the right only sufficiently so that the force F2 is balanced by F3 of the spring 35, whereupon any additional relaxation of the pressure in the brake cylinder will cause the fluid pressure within chamber 19 to open the valve 15. Piston 8 is then displaced to the left under the force of spring 35, thereby restoring the piston to the position shown in FIG. 1.

In the embodiment of FIG. 1, an accidental breakage of any of the lines 3 and 3′ will result in inoperativeness of the piston 32 and will make the piston remain in the illustrated position under the bias of the spring 41. This results in displacement of the switchover point from A to B as shown in FIG. 2. It will be apparent that the fluid pressure which is to be attained at the switchover point B is increased by two times if the predetermined force of the spring 35 is equivalent to the predetermined force of the spring 41. By such caluculation of spring 35 and 41, the decreased amount of braking force can be almost beneficially supplemented when any of the braking systems is accidentally broken as to the vehicle having twin braking systems of the embodiment by applying additional force to the brake pedal.

A reference numeral 49 shows a balancing cylinder in which a piston 50 is received and pressed by two springs on both sides in opposite directions so as to be movable in accordance with the difference of pressure between two lines 3 and 3′.

Figure 3:
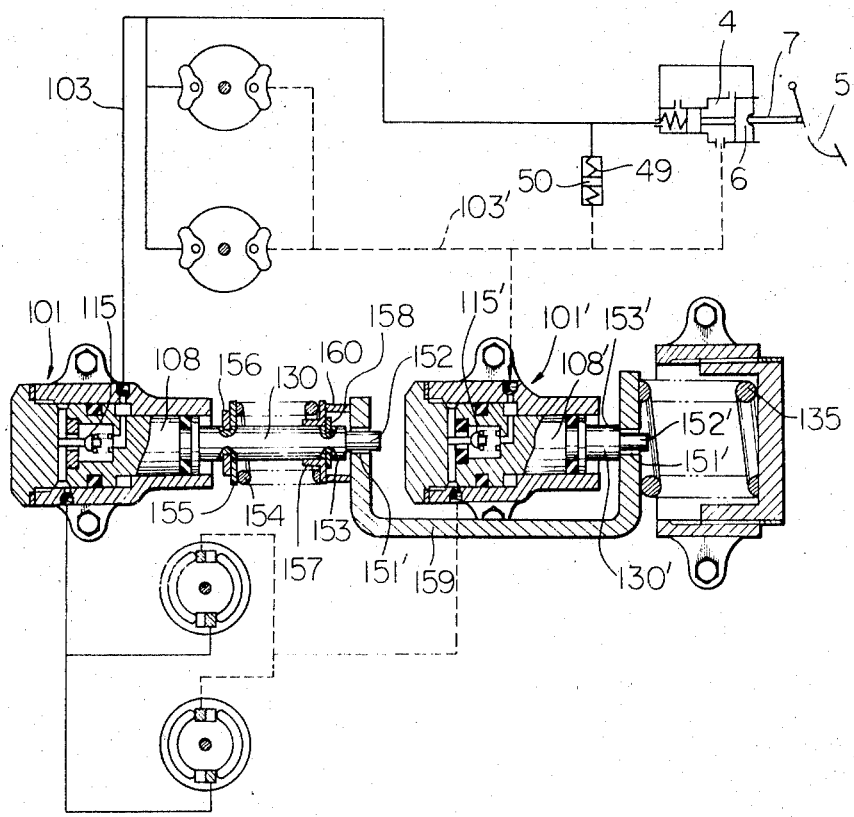
FIG. 3 shows another embodiment of the invention.

The regulators 101 and 101′ of FIG. 3 operate in a manner identical to that of FIG. 1 with the exception that displacement of each of the pistons 108 and 108′ cooperates to press connector 159 to the right against the bias of the single restoring spring 135. When any of transmission lines 103 and 103′ is broken, the regulator which communicates with the remaining line thereafter increases its switchover point in the graphical representation of the braking pressure, in the same way as performed by the embodiment of FIG. 1.

In the embodiment of FIG. 3, the stems 130 and 130′ enter their reduced extremity ends 152 and 152′ into holes 151 and 151′ of the connector 159 respectively. Although the shoulder 153′ always abuts against the connector, the shoulder 153 does not abut against the connector. There is really no reason, except for the sake of mere purpose of configuration, why the shoulder 153 is provided.

The shoulder 153 is always in detached relationship with the connector so that the force of the fluid pressure in the regulator 101 is applied to the connector through the spring 154, flanged collar 157, and retainer 160, the predetermined force of the spring 154 being caluculated sufficiently to bear and transmit the force of the fluid pressure in the regulator 101.

Compression spring 154 bears against washer 155 supported by snap ring 156 on the stem 130 and flanged collar 157 slidably mounted on the stem and supported by another snap ring 158, i.e., the elongation of spring 154 is constrained over the definition by the washer and collar but, is retractable. The connector is provided at its left end with a retainer 160 always in abutment relationship with the flanged collar 157 so that the force of fluid pressure in the regulator 101 is transmitted through the spring 154 to the connector 159. In the rest position shown in FIG. 3 where the pistons 130 and 130' abut the inside surface of their sockets respectively and hold their valves in open positions, the gaps mentioned below may beneficially be calculated as follows:

| | |
|---|---|
| Between valve 115 and its seat | 1.5 millimeters |
| Between valve 115' and its seat | 1.0 millimeters |

By that calculation, each of the pistons 108 and 108' is allowed to perform its fluttering motion without interference with each other during their controlling actions.

Figure 4:
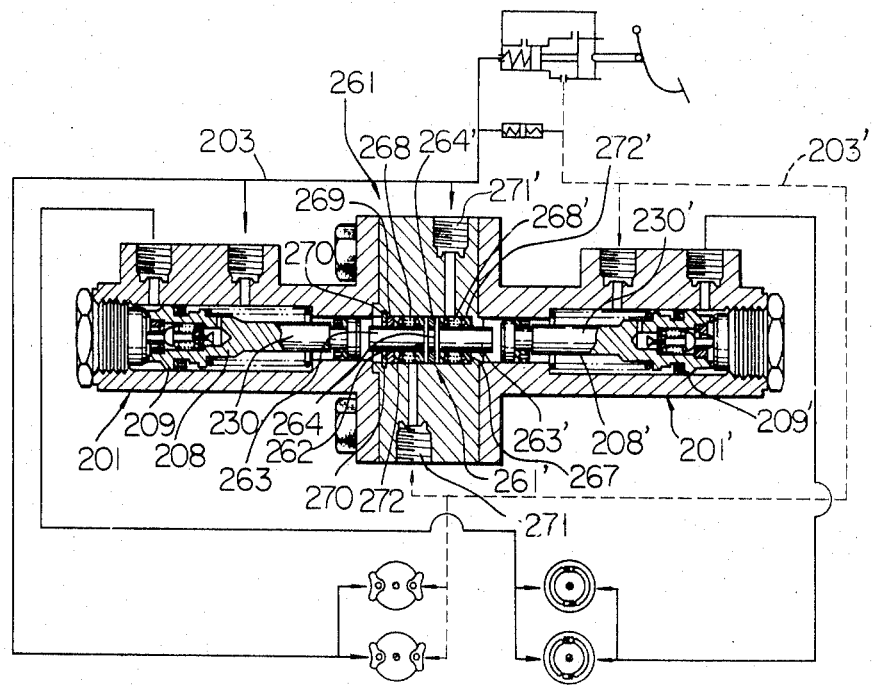
FIG. 4 shows still another embodiment of the invention.

In FIG. 4 is shown a regulator which operates in a manner identical to that of FIG. 1, with the exception that displacement of the regulator pistons 208 and 208' is further retarded by the restoring force $Fr$ of the fluid pressure in the pressure responsive cylinder 261. When any of the transmission lines are broken, such restoring force is applied to a regulator which connects with the remaining transmission line not broken.

Referring to FIG. 4 further in detail, the responsive cylinder 261 is provided with a piston 262 in it, at both ends of which are outwardly extending stems 263 and 263' in line with the pistons 208 and 208' respectively. Piston 262 is provided with a circumferencial groove 264, in which a ring-type seal 264' is received for preventing escape of the hydraulic fluid. At the right-hand end of the cylinder 261, shoulder 267 is formed to which a flange-type seal 272' is received for preventing escape of the fluid. The other end of the cylinder 261 is provided at its inner circumferencial surface with a ring 269 supported by snap ring 270 so as to prevent the ring 269 from further moving to the left by fluid pressure. Spring 268 bears against the piston 262 and seal 272' interposed between ring 269 and the spring 268, while spring 268' bears against the piston 262 and seal 272' interposed between the shoulder 267 and the spring 268'.

Figure 5:
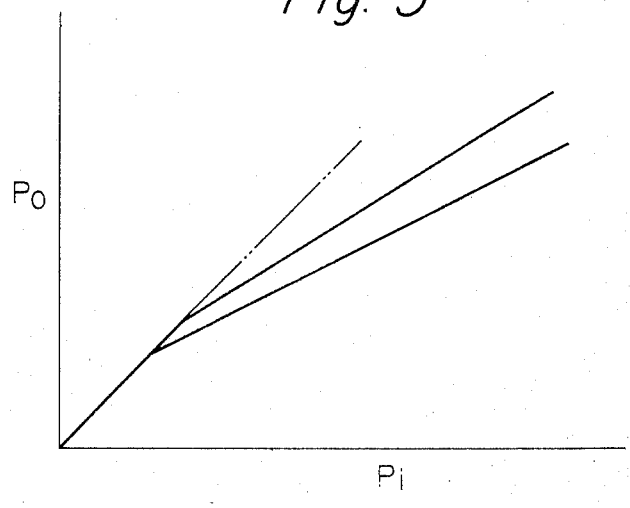
FIG. 5 is a graphical representation similar to FIG. 2 as effected by the embodiment of the regulator as shown in FIG. 4.

During normal operation, the piston 262 is in the position shown in FIG. 4, i.e., pressed by the two forces of fluid pressure in adverse directions to each other, whereby the piston is held in a neutral position between the top surfaces of the stems 230 and 230'. When any one of the transmission lines 203 and 203' such as, for example, line 203' is broken and transmission of pressure fluid therethrough ceases, the application of the force of the fluid pressure through the inlet 271 ceases, accordingly the stem 263 is displaced to the left and brought into contact at its top surface with the stem 230 of the piston 208 by the force of fluid pressure transmitted into the right-hand chamber of the cylinder 261 through the inlet 271', whereby that force is applied to the piston 230 of the regulator 201. Consequently, the ratio of area A1 to A2 of the differential piston 208 is substantially changed, that is, the force of the fluid pressure applied on the right hand surface of the head 209 is increased. By the action of the balancing piston 262, the inclination is changed at the switchover point of the line as to the graphical representation of the braking pressure, while the embodiments of FIG. 1 and FIG. 3 cannot change such inclination. In this manner, an output pressure closer to the twofold value of the out put pressure attained in normal operation is attained by applying additional force to the brake pedal, than is attained by the embodiments of FIG. 1 and FIG. 3. This will be apparent in FIG. 5.

By the forgoing, there has been provided an improved brake regulator calculated to fulfil the objects hereinabove set forth, and while preferred embodiments have been illustrated and described in detail hereinabove, various additions, substitutions, modifications and omissions may be made thereto without departing from the spirit of the invention as encompassed by the appended claims.

What is claimed is:

1. A brake system for an automotive vehicle having at least two sets of rear wheel-brakes with respective wheel-brake cylinders, at least one of said sets of rear-wheel brakes being operatively connected with a set of front-wheel brakes, comprising:
    master cylinder means having a pair of sections for respectively pressurizing the wheel-brake cylinders of said sets of brakes;
    fluid transmission-lines connecting each of said sections of said master cylinder means with the respective wheel-brake cylinders of at least one of said sets of front-wheel brakes and with the wheel-brake cylinders of at least one of said sets of rear wheel brakes;
    a regulator disposed in each of said transmission lines connecting each of said sections of said master cylinder means with the rear wheel-brake cylinders of the corresponding set of rear wheel-brakes, said regulator including a body having an axial bore, a differential piston within said bore, a spring-biased valve actuated by said piston and a spring for urging the piston into an extreme position to hold the valve open while permitting the piston to close the valve after an initial fluid pressure reaches a predetermined level in the transmission line connecting each of said sections with said wheel brake cylinders of the corresponding set of wheel brakes; and
    means for applying an additional restoring force to the differential piston to aid said spring in urging the piston into an extreme position to hold said valve open in response to the failure of fluid pressure in one of said fluid transmission-lines connecting one of said sections with the respective wheel-brake cylinders of the corresponding set of rear wheel brakes.

2. A brake system for an automotive vehicle having two sets of front-wheel brakes with respective wheel-brake cylinders and two sets of rear wheel brakes with respective wheel-brake cylinders, at least one of said two sets of rear wheel-brakes being operatively connected with at least one of said two sets of front-wheel brakes, comprising:
    master cylinder means having a pair of sections for respectively pressurizing the wheel-brake cylinders of said sets of brakes;
    fluid transmission-lines connecting each of said sections of said master cylinder means with the respective wheel-brake cylinders of at least one of said sets of front-wheel brakes and with the wheel brake cylinders of at least one of said sets of rear wheel brakes;
    a regulator disposed in each of said transmission lines connecting each of said sections with the rear wheel-brake cylinders of the corresponding set of rear wheel brakes, said regulator including a body having an axial bore, a differential piston within said bore, a spring-biased valve actuated by said piston and a spring for urging the piston into an extreme position to hold the valve open while permitting the piston to close the valve after an initial fluid pressure reaches a predetermined level in the transmission line connecting each of said sections with said sets of rear-wheel brakes; and
    means disposed in each of said transmission-lines connecting each of said sections of said master cylinder means with the respective wheel-brake cylinders of the corresponding set of rear-wheel brakes for applying an additional force to the differential piston to aid said spring in urging the piston into an extreme position to hold said valve open in response to the failure of fluid pressure in one of said fluid transmission-lines connecting one of said sections with the respective wheel-brake cylinders of the corresponding set of rear-wheel brakes.

3. A brake system for an automotive vehicle having at least two sets of rear wheel-brakes with respective wheel-brake cylinders, at least one of said sets of rear-wheel brakes being operatively connected with a set of front- wheel brakes, comprising:

master cylinder means having a pair of sections for respectively pressurizing the wheel-brake cylinders of said sets of brakes; fluid transmission lines connecting each of said sections of said master cylinder means with the respective wheel-brake cylinders of at least one of said set of front-wheel brakes and with the wheel-brake cylinders of at least one of said sets of rear wheel brakes;

a regulator disposed in each of said transmission lines connecting each of said sections with the rear wheel-brake cylinders of the corresponding set of rear wheel-brakes, said regulator including a body having an axial bore, a differential piston within said bore, a spring-biased valve actuated by said piston and a spring for urging the piston into an extreme position to hold the valve open while permitting the piston to close the valve after an initial fluid pressure reaches a predetermined level in the transmission line connecting each of said sections with said sets of rear-wheel brakes; and single means for applying an additional force to the differential piston of either of said regulators to aid said spring in urging the piston into an extreme position to hold said valve open in response to the failure of fluid pressure in a fluid transmission-line connecting one of said sections with the respective wheel-brake cylinders of the corresponding set of rear wheel brakes.

4. A brake system as claimed in claim 3 wherein said single means includes a spring and a connector between said regulators, said spring normally urging the pistons of said regulators together into extreme positions to hold the valves open while permitting the pistons to close the valves after an initial fluid pressure reaches a predetermined level in the transmission lines connecting each of said sections with said sets of rear-wheel brakes.

5. A brake system as claimed in claim 3 wherein said single means includes a cylinder and a piston reciprocable therein, stems at opposed ends of said piston extending to normally disengage with said pistons of said regulators, said reciprocable piston subdividing the internal space of said cylinder into two chambers communicating respectively with said wheel-brake cylinders of the corresponding set of rear-wheel brakes.

\* \* \* \* \*